US00RE34461E

United States Patent [19]

Buselli

[11] E Patent Number: Re. 34,461

[45] Reissued Date of Patent: Nov. 30, 1993

[54] WALL MOUNTED DECORATIVE ART CONVERTIBLE TO A TOSS GAME WITH CATCH AREA

[76] Inventor: Oscar L. Buselli, 307 Spring St., Bessemer, Mich. 49911

[21] Appl. No.: 833,988

[22] Filed: Feb. 11, 1992

Related U.S. Patent Documents

Reissue of:

[64] Patent No.: 4,971,333
Issued: Nov. 20, 1990
Appl. No.: 429,774
Filed: Oct. 30, 1989

U.S. Applications:

[63] Continuation-in-part of Ser. No. 331,611, Mar. 30, 1989, Pat. No. 4,919,436.

[51] Int. Cl.[5] ..... A63F 9/02; F41J 1/00

[52] U.S. Cl. ..... 273/346; 273/407; 273/415; 273/DIG. 30

[58] Field of Search ..... 273/346, 347, 407, 408, 273/415, DIG. 30

[56] References Cited

U.S. PATENT DOCUMENTS

| | | | |
|---|---|---|---|
| 1,104,219 | 7/1914 | Polverino . | |
| 1,926,612 | 9/1933 | Day . | |
| 2,074,850 | 3/1937 | McCullough et al. . | |
| 2,145,434 | 1/1939 | Rubin | 273/347 |
| 2,234,814 | 3/1941 | Weaver . | |
| 2,506,189 | 5/1950 | Attridge . | |
| 3,026,110 | 3/1962 | Hess et al. | 273/424 X |
| 3,810,616 | 5/1974 | Murphy . | |
| 3,857,566 | 12/1974 | Lemelson et al. | 273/346 |
| 3,917,271 | 11/1975 | Lemelson et al. . | |
| 3,927,881 | 12/1975 | Lemelson et al. . | |
| 3,997,162 | 12/1976 | Scullin | 273/346 X |
| 4,055,343 | 10/1977 | Stuart | 273/346 X |
| 4,113,251 | 9/1978 | Imes, Jr. | 273/428 X |
| 4,415,154 | 11/1983 | Engelhardt | 273/346 X |
| 4,671,514 | 6/1987 | Wilson-Diehl | 273/DIG. 30 X |
| 4,919,436 | 4/1990 | Buselli | 273/346 |
| 4,971,333 | 11/1990 | Buselli | 273/346 |

*Primary Examiner*—William H. Grieb
*Attorney, Agent, or Firm*—Basile and Hanlon

[57] ABSTRACT

A wall hanging toss game includes a generally flat, rigid member having a first surface suitable for printing with a plurality of recesses formed therein spaced from one another. A plurality of generally thin, wafer-like hook material targets are adhesively secured to the rigid member in the recesses of the first surface, such that the targets appear generally flush with the first surface and appear separated from one another by open areas of the first surface, wherein the ratio of open area to target area is preferably greater than one to one dependant upon the particular design desired. A shock absorbing projectile covered with or made of loop material is capable of being securely held in place when in contact with the hook material targets and reduces bounce-back when impacting the non target areas. A catch member is provided for catching and supporting the projectile, when the projectile hits the first surface and falls vertically downwardly after missing the targets. The invention is a combined decorative wall hanging and wall toss game. The wall hanging is convertible to a wall toss game with the catch area extending outwardly from the rigid member for catching missed tosses.

15 Claims, 3 Drawing Sheets

WALL MOUNTED DECORATIVE ART CONVERTIBLE TO A TOSS GAME WITH CATCH AREA

Matter enclosed in heavy brackets [ ] appears in the original patent but forms no part of this reissue specification; matter printed in italics indicates the additions made by reissue.

RELATED APPLICATIONS

This application is a continuation-in-part of U.S. patent application Ser. No. 07/331,611 filed Mar. 30, 1989, now U.S. Pat. No. 4,919,436, granted Apr. 24, 1990.

FIELD OF THE INVENTION

The invention relates to a decorative wall hanging which is convertible to a wall toss game with separated targets used in combination with a catch area for catching missed tosses.

BACKGROUND OF THE INVENTION

Prior art wall games feature a tight grouping of targets, as in conventional darts, and normally feature a one-piece target material, as in the case of safety darts. In either case, the result is one large target area and therefore is limited in terms of creativity with regard to aesthetics and the variety of games possible. Prior art wall toss games typically include such things as traditional darts, plastic soft point darts, and safety darts, either tipped with a flat VELCRO surface, or a VELCRO covered ball. Traditional and plastic soft point darts use a target consisting of a tight grouping of different value targets separated by a thin wire or a ridge of plastic. These target types require a pointed dart to determine which target was hit. However, even the plastic pointed dart can cause eye injuries if used improperly. On the other hand, safety darts use one large target material divided by printed lines. These safety darts typically include a flat VELCRO surface or a VELCRO covered ball. Many times with these darts, it is difficult to tell a hit from a miss, because a toss can be on the line.

The present invention combines safety with targets that are separate and distinct, therefore having the advantage that a miss is obvious. The present invention takes full advantage of the high visibility of the wall hanging to provide an aesthetically pleasing and decorative wall having when the toss game is not in use. The present invention also combines separated targets with the use of a catch area which allows the design of a limitless variety of attractive games with no restriction on the placement, color, shape, size, or combined total of target surface area. Due to the flexibility in the design of the game, the present invention can advantageously be designed to appeal to different consumer groups, or to tie in with advertising, or to a base game format on a company slogan, or any popular current theme. The present invention works successively as an advertising medium, because it is highly visible and gets people to interact.

SUMMARY OF THE INVENTION

The present invention is an improvement over the prior art wall toss games in that the present invention takes full advantage of the high visibility of the wall hanging. The separated targets are an important characteristic in the concept of the game. Separated targets are used as attractive ornamentation for the wall hanging. Targets are spaced from one another allowing areas in and around the targets to be used as printing surfaces. The targets are shaped and arranged in attractive patterns, symmetrical or otherwise. The targets are colored, shaped, and placed in regard to the theme of the wall hanging, and to the amount of background area needed for printing. The game provides for a high ratio of background surface area to target surface area, where the background surface area can be used as an advertising medium by the arrangement of a company name, logo, slogan or the like. Total target surface area is flexible in this regard. Targets can be shaped and colored to the main theme of the wall hanging, or a lesser role allowing the printing to be used to state the theme.

The present invention includes separated VELCRO hook targets mounted on a printable non-target surface which is flat and hard. Shock absorbing VELCRO loop beanbags are used as the projectile in the game. The beanbags are tossed toward the target surface in an attempt to attach the beanbags to the target areas. A catching means [needs to] *may* be provided *in order* to prevent missed tosses from falling to the floor, because a high percentage of tosses will impact the non-target areas. The shock absorbing characteristics of the bean bags reduce bounce-back when impacting the non-target areas and therefore, the bean bags tend to fall downwardly into the catching means. The catch area may be fixed to the wall hanging or may be removable from the wall hanging. In a preferred embodiment, the catch area, when not set up for playing the wall toss game, hinges back to frame the game presenting the appearance of a decorative wall hanging. VELCRO hook targets are a thin wafer-like material, which can be easily glued and recessed into a printable surface such as melamine, wood or the like. Targets appear flush with the printable surface which lends itself to being very compatible with printing. The target areas are able to hold the beanbag projectiles, or markers, on the surface, which can be used as ornamentation for the wall hanging. This allows for games to be designed, such as Tic-Tac-Toe, or other games where a player may attempt to cover as much of the target with his projectile as possible, making it more difficult for subsequent players to hit the same target.

These and other advantages, features and characteristics will become more apparent to those skilled in the art after reading the following detailed description of the invention in conjunction with the drawings.

BRIEF DESCRIPTION OF THE DRAWINGS

In the drawings, like references numerals refer to similar elements throughout the various views, in which.

DESCRIPTION OF THE PREFERRED EMBODIMENT

Figure 2:
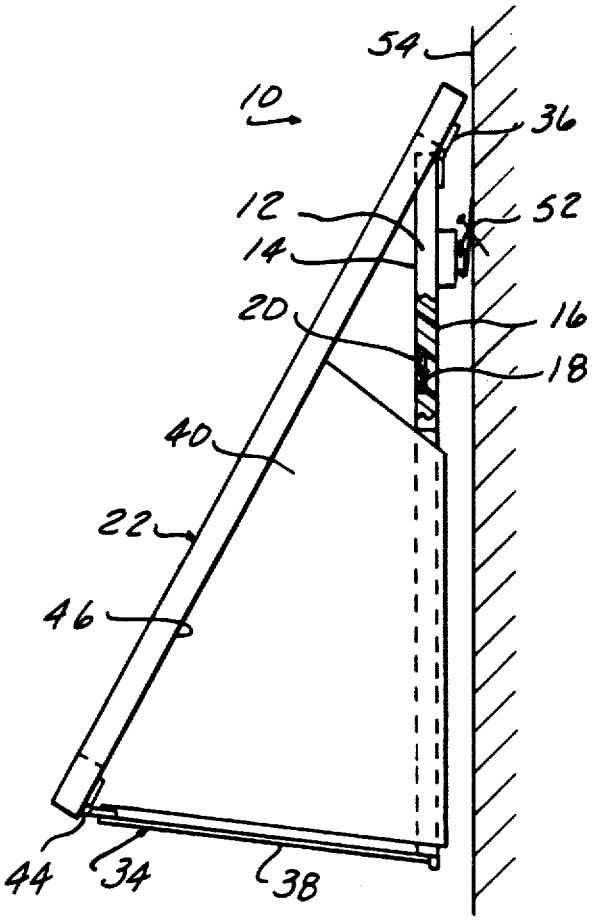
FIG. 2 is a side elevational view of the wall toss game with a catch area deployed according to a preferred embodiment of the present invention.
Figure 1:
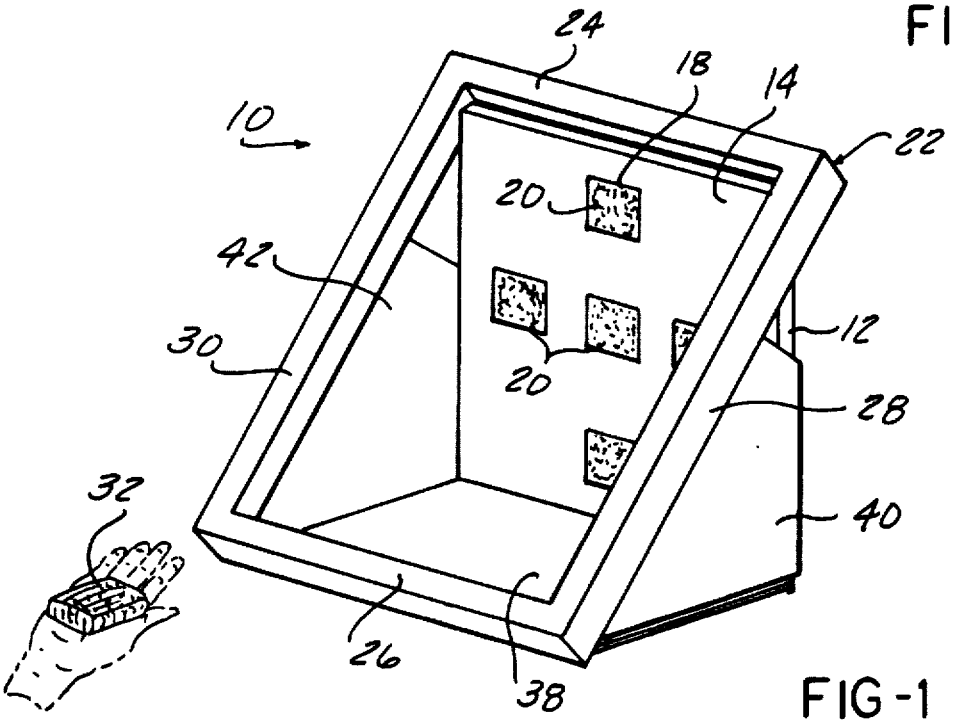
FIG. 1 is a perspective view of a wall toss game according to the present invention.

The wall hanging/wall toss game 10 is shown in a perspective view in FIG. 1. The wall hanging 10 includes a generally flat, rigid panel-like member 12 with a first surface 14 forming the front visible background portion of the wall hanging/wall toss game 10. A second surface 16 forms the rear of the panel-like member 12 which faces the vertical wall surface 54 that is used to support the wall hanging/wall toss game 10. As best seen in FIGS. 1 and 2, a plurality of recesses 18 are formed in the first surface 14, and a plurality of separated thin, wafer-like hook material targets 20 are adhesively secured within the recesses 18 such that the targets 20 appear flush with the first surface 14. The hook material targets can be made in any color, shape, or size desirable from commercially available material, such as VELCRO. Preferably, the targets 20 are separated from one another to provide a high ratio of background surface area 14 in between individual targets 20, wherein the first surface 14 can be made from materials, such as for example, plastic laminates, melamine, or a plywood veneer which can be stained, lacquered, or painted. In addition, it is anticipated that the first surface 14 is selected such that the surface is suitable for printing. The separated targets 20 provide an attractive ornamentation for the wall hanging when in a first stored position such as that shown in FIG. 3. A frame 22 surrounds the outer periphery of the rigid member 12. The frame 22 includes an upper horizontal frame member 24, a lower horizontal frame member 26, and spaced vertical frame members 28 and 30. A projectile 32, such as a bean filled bag, is provided for throwing at the targets 20 from a distance by a player. The projectile 32 has sufficient throwing weight while eliminating dangerous edges and points which can cause eye injuries. The projectile 32 is preferably made of [our] *or* covered with a loop material, such as VELCRO, capable of being securely held in place when in contact with the hook material targets 20. The projectile 32 has a shock absorbing quality which reduces bounce-back when impacting the first surface 14. The shock absorbing quality of the projectile 32 [works] *may work* in conjunction with the catch means 34, which is supported from the frame for catching and supporting the projectile, when the projectile 32 misses the target 20, and hits the first surface 14, thereafter falling vertically downwardly from the rigid member 12.

Figure 3:
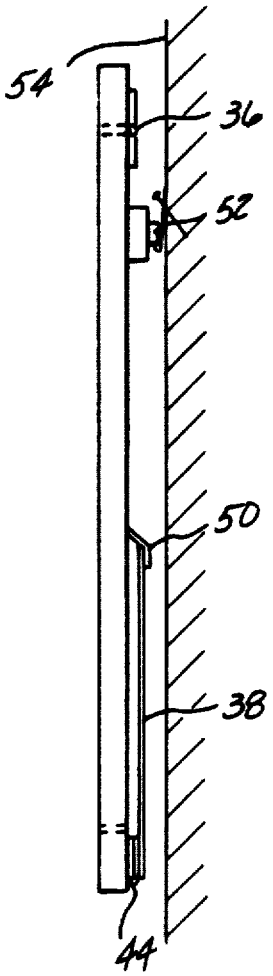
FIG. 3 is another side elevational view of the wall toss game with the catch area stored.
Figure 4:
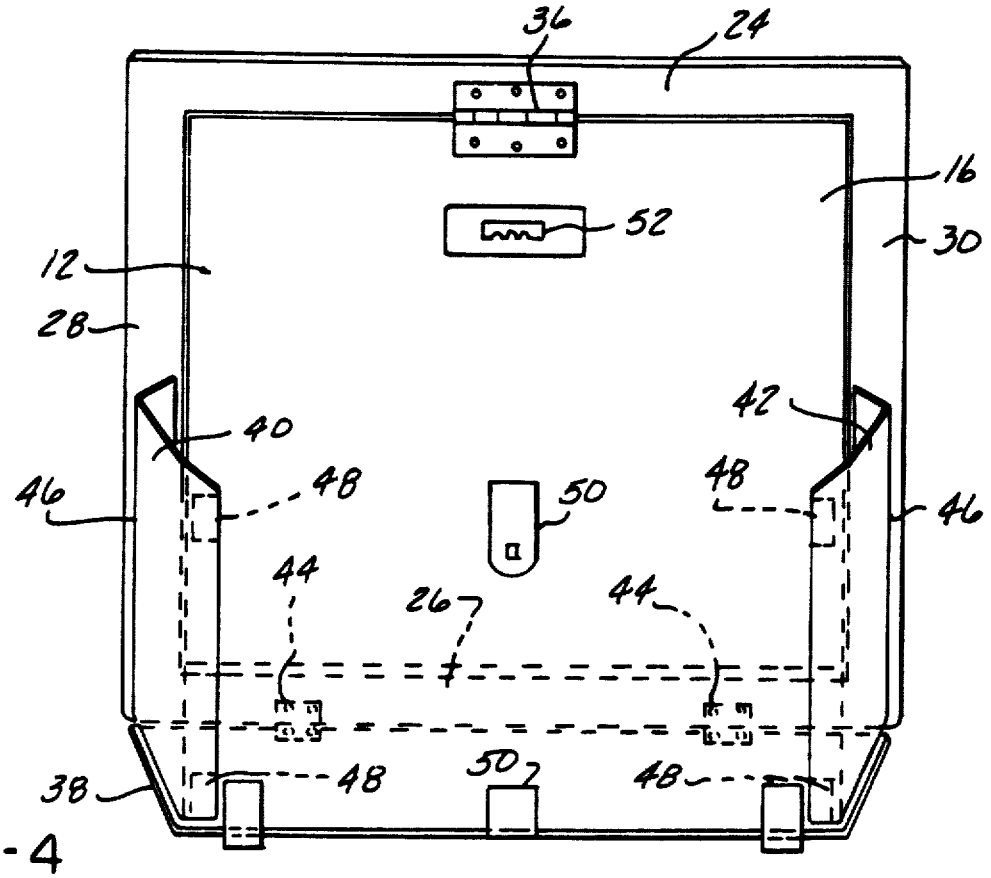
FIG. 4 is a rear view of the back of the wall toss game with the catch area deployed.
Figure 5:
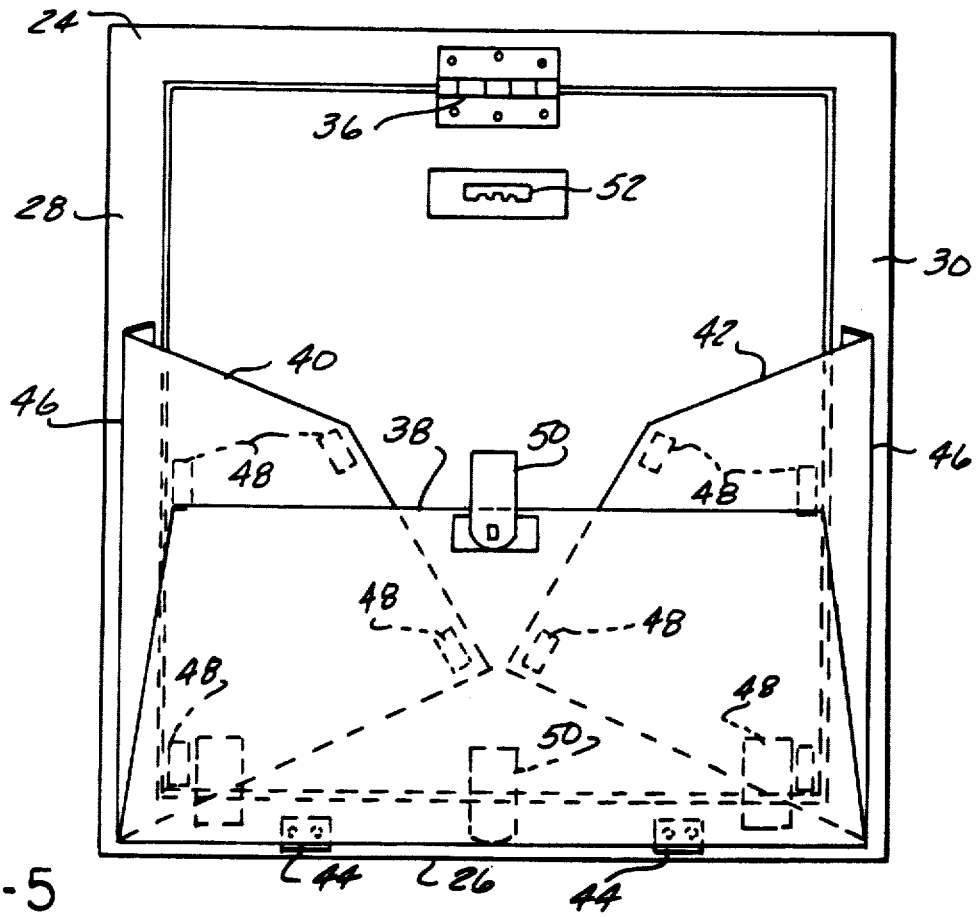
FIG. 5 is a rear view of the back of the wall toss game with the catch area stored.
Figure 6:
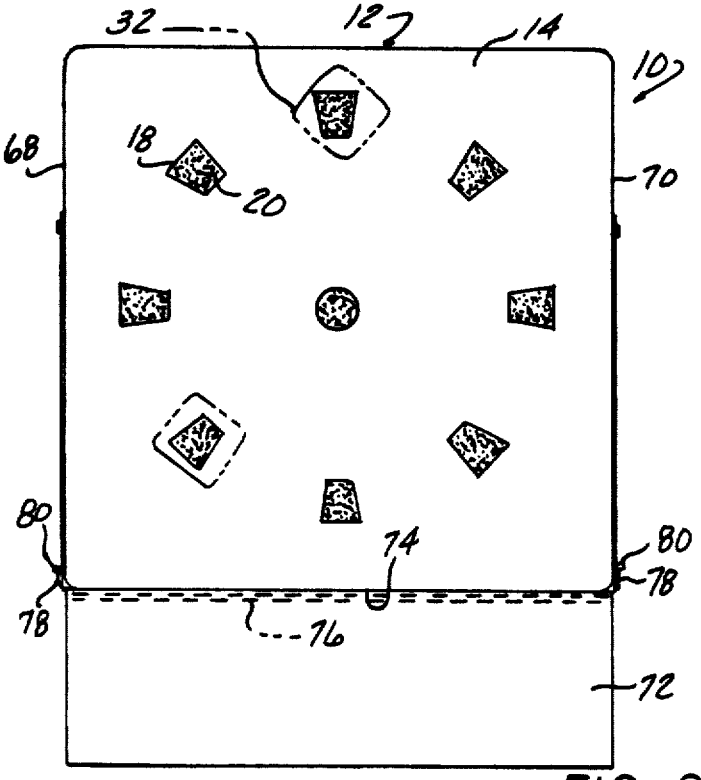
FIG. 6 is a front view of another embodiment of the wall toss game according to the present invention.
Figure 8:
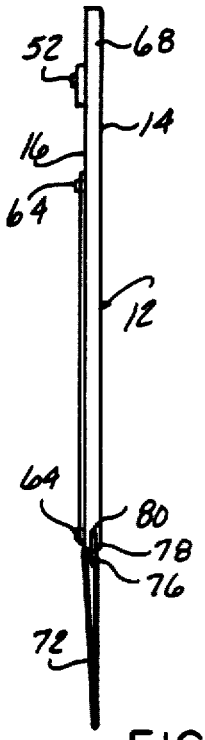
FIG. 8 is a side view of the wall toss game with the catch means in a stored position.
Figure 7:
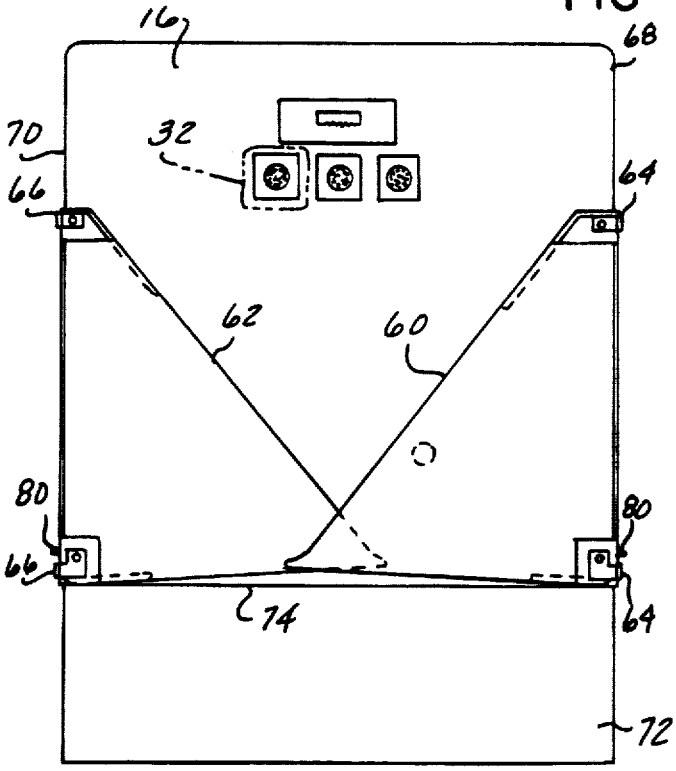
FIG. 7 is a rear view of the back of the wall toss game with the catch means in a stored position.
Figure 9:
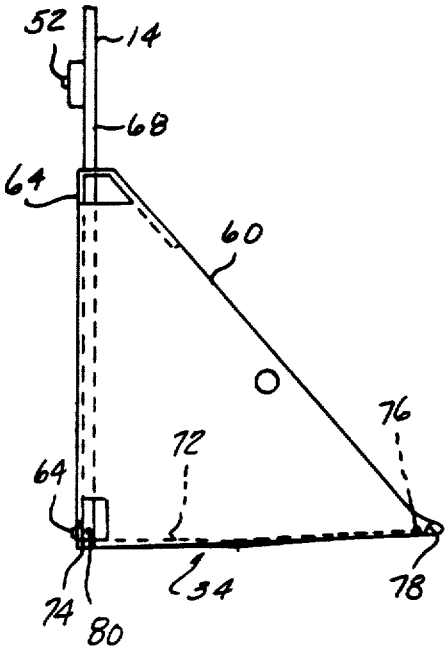
FIG. 9 is another side elevational view of the wall toss game with the catch means deployed in a catching position.

The catch means 34 preferably includes first hinge means 36 connected between the upper horizontal frame member 24 and the rigid member 12 allowing pivotal movement of the frame 22 between a first position, shown in FIG. 3, wherein the frame 22 is generally co-planar with the rigid member 12 and a second position, shown in FIG. 2, wherein the frame 22 angles outwardly with respect to the rigid member 12 such that the lower horizontal frame member 26 is spaced from the rigid member 12. A catch member 38 is connected between the lower horizontal frame member 26 and the rigid member 12 when the frame 22 is disposed in the second position. The catch member 38 is capable of supporting projectiles which miss the targets 20 and fall vertically downward after contacting the first surface 14. A pair of side panels 40 and 42 can also be provided connected at one end to the corresponding vertical frame members 28 and 30 and connected at another end to the rigid member 12 to substantially obstruct an area between the angled vertical frame members 28 and 30 and the rigid member 12 when the frame 22 is in the second position. Second hinge means 44 can be provided between the catch member 38 and the lower horizontal frame member 26 for pivoting the catch member 38 from a first stored position generally parallel to the rigid member 12 adjacent the second surface 16, as shown in FIGS. 3 and 5, and pivotal into a second position generally perpendicular to the rigid member 12 extending outwardly with respect to the first surface 14 as shown in FIGS. 2 and 4. Third hinge means 46 can also be provided disposed between each side panel 40 and 42 and the corresponding vertical frame member 28 and 30 respectively, for pivoting the side panel between a first stored position generally parallel to the rigid member 12 adjacent the second surface 16, as shown in FIGS. 3 and 5, and a second position generally perpendicular to the rigid member 12 extending outwardly with respect to the first surface 14 as shown in FIGS. 2 and 4. As best seen in FIGS. 4 and 5, first means 48 are provided for securing the side panels in the second position. In the first position, the side panels 40 and 42 are preferably folded adjacent the second surface 16 of the rigid member 12 an disposed between the second surface 16 and the catch member 38. Second means 50 are provided for securing the catch member in the first and second positions. The first and second means for securing can include hook and loop material, such as VELCRO. Supported means 52 is provided connected to the second surface 16 of the rigid member 12 for supporting or hanging the rigid member 12 from the vertical wall surface 54.

Another embodiment of the wall hanging/wall toss game 10 is shown in FIGS. 6–9. As previously described, the wall hanging 10 includes a generally flat, rigid panel-like member 12 with a first surface 14 forming the front visible background portion of the wall hanging/wall toss game 10. A second surface 16 forms the rear of the panel-like member 12 which faces the vertical wall surface 54 that is used to support the wall hanging/wall toss game 10. A plurality of recesses 18 are formed in the first surface 14, and a plurality of separated thin, wafer-like material targets 20 are adhesively secured within the recesses 18 such that the targets 20 appear flush with the first surface 14. The targets 20 are separated from one another to provide a high ratio of background surface area 14 in between individual targets 20. The hook material targets can be made in any color, shape, or size desirable from commercially available material, such as VELCRO. The first surface 14 is selected to be suitable for printing and can be made from materials such as, plastic, laminates, melamine, or a plywood veneer which can be stained, lacquered or painted. The separated targets 20 provide an attractive ornamentation for the wall hanging when in a first stored position, such as that shown in FIG. 6–8.

A projectile 32, such as a bean filled bags, is provided for throwing at the target 20 from a distance by a player. The projectile 32 has sufficient throwing weight while eliminating dangerous edges and points which can cause eye injuries. The projectile 32 is preferably made up of or covered with a loop material, such as VELCRO, capable of being securely held in place when in contact with the hook material targets 20. The projectile 32 has a shock absorbing quality which reduces bounce back when impacting the first surface 14. The shock absorbing quality of the projectile 32 [works] *may work* in conjunction with the catch means 34, which is supported from the frame for catching and supporting the projectile, when the projectile 32 misses the target 20, and hits the first surface 14, thereafter falling vertically downward from the rigid member 12.

The catch means 34 in this embodiment preferably includes first and second side panels, 60 and 62 respectfully, pivotally connected to the rigid number 12 adjacent the first and second side edges, 68 and 70 respectively. First and second hinge means, 64 and 66 respectively, pivotally connect the first and second side panels, 60 and 62 respectfully, to the rigid member 12 adjacent the first and second side edges, 68 and 70 respectively. Each side panel is movable between a first position, wherein the side panel is disposed generally parallel and adjacent to the second surface 16 of the rigid member 12, and a second position, wherein each of the side panels extends outwardly generally perpendicular to the first surface 14 of the rigid member 12 and generally parallel to one another. The first position or stored position can best be seen in FIGS. 6–8. The second position or the deployed position can be best seen in FIG. 9.

A catch member 72 is connected to the rigid member 12 adjacent the bottom edge 74. The catch member 72 is connectable to the first and second side panels, 60 and 62 respectively, for receiving and supporting the projectile means 32 that fail to hit and/or attach to the targets 20 when the panels are in the second position or deployed position. The catch member 72 can be made of a flexible sheet material which hangs downwardly from the bottom edge 74 of the rigid member 12 in a banner-like manner when the first and second side panels. 60 and 62 respectfully, are in the stored first position. Preferably, the catch member 72 has a generally rectangular shape with a rigid elongated horizontal edge 76 opposite from the bottom edge 74 of the rigid member 12. The rigid horizontal edge 76 of the catch member 72 is supportable by support means from the rigid member 12 adjacent the bottom edge 74 when the first and second side panels are in the stored first position. The support means can include fabric, string or elastic loops 78 disposed adjacent each corner of the elongated horizontal edge 76. The loops 78 are engagable with outwardly extending pegs or dowels 80 disposed in the side edges 68 and 70 respectively of the rigid member 12. This configuration provides a banner-like display area below the rigid member 12 which is half the size of the catch member 72. The display area can be used for company names, slogans, or the like. The loops 78 can also be used for attaching the catch member 72 to the first and second side panels 60 and 62 respectively, when in the deployed position. In this configuration, the loops are engaged with protruding portions of the respective side panels spaced outwardly from the first surface 14 of the rigid member 12 at a position approximately equal to the length of the catch member 72.

Having disclosed certain preferred embodiments of the invention for purposes of explanation, further modifications or variations thereof, after study of this specification, will or may occur or become apparent to persons skilled in the art to which is invention pertains. It should be recognized that the present invention is not meant to be limited to the preferred embodiment described in detail, but rather reference should be made to the appendant claims in determining the scope of the present invention.

What is claimed is:

1. A wall hanging toss game comprising the combination of:

a generally flat, rigid member having a first surface suitable for printing, a second surface opposite from the first surface, and an outer periphery including a top edge, a bottom edge, and first and second side edges between the first and second surfaces, said first surface having a plurality of recesses formed therein spaced from one another;

a plurality of generally thin, wafer-like hook material targets adhesively secured to the rigid member in the recesses of the first surface, such that the targets appear generally flush with the first surface and appear separated from one another by open areas of the first surface;

shock absorbing projectile means covered with loop material capable of being securely held in place when in contact with the hook material targets, said projectile means for throwing at the hook material targets from a distance; and catch means for catching and supporting the projectile means [with] *when* the projectile means hit the first surface and fall vertically downwardly, said catch means supported from said rigid member.

2. The wall hanging toss game of claim 1, wherein said catch means comprises:

first and second side panels pivotally connected to the rigid member adjacent the first and second side edges respectively, each side panel movable between a first portion wherein each side panel is disposed generally parallel and adjacent to the second surface of the rigid member and a second position wherein each of the side panels extends outwardly generally perpendicular to the first surface of the rigid member and generally parallel to one another; and a catch member connected to the rigid member adjacent the bottom edge, the catch member connectible to the first and second side panels for receiving and supporting the projectile means that [fall] *fail* to hit and attach to the targets when the panels are in the second position.

3. The wall hanging toss game of claim 2, wherein said catch member further comprises a flexible sheet material hanging downwardly from said bottom edge of said rigid member when said first and second side panels are in said first position.

4. The wall hanging toss game of claim 3, wherein said catch member has a generally rectangular shape with a rigid elongated horizontal edge opposite from said bottom edge of said rigid member, said rigid horizontal edge of said catch member supportable from said rigid member adjacent said bottom edge when said first and second side panels are in said first [portion] *position*.

5. The wall hanging toss game of claim 4, wherein said catch member includes an elastic loop disposed adjacent each end of said rigid elongated horizontal edge, each loop engagable with an outer end of a respective side panel when said side panels are in said second position to support said catch member in a catching position, and each loop engagable with said rigid member when said panels are in said first position to support said catch member in a stored position.

6. The wall hanging toss game of claim 2, further comprising:

first hinge means connecting the first side panel to the rigid member for pivotal movement between the first position and the second position; and second hinge means connecting the second side panel to the rigid member for pivotal movement between the first position and the second position.

7. The wall hanging toss game of claim 1 further comprising:

means connected to the second surface of the rigid member for supporting the rigid member from a vertical wall surface.

8. The wall hanging toss game of claim 1 further comprising:

means for supporting the catch means in a first stored position wherein said catch means is disposed generally parallel to the rigid member and in a second deployed position wherein said catch means is disposed generally perpendicular to the rigid member.

9. A wall hanging toss game comprising:

a flat, rigid member having first and second generally planar surfaces and a peripheral side edge extending between said first and second planar surfaces;

a plurality of hook material targets secured to the rigid member and separated from one another by open areas of the first surface of the rigid member;

a catch member connected to the rigid member adjacent a portion of the peripheral side edge such that the catch member is movable between a first stored position wherein the catch member is disposed generally parallel to the rigid member and a second deployed position wherein the catch member is disposed generally perpendicular to the rigid member;

shock absorbing projectile means covered with loop material capable of being securely held in place when in contact with the hook material targets for throwing at the targets when the catch member is in the second deployed position; and means for holding the catch member in the second deployed position such that the catch member is disposed for receiving and supporting the projectile means that [fall] *fail* to hit and attach to the targets.

10. The wall hanging toss game of claim 9 wherein said holding means further comprises:

first and second side panels pivotally connected to said rigid member adjacent opposite side edges respectively, each side panel movable between a first position wherein each of said side panels is disposed generally parallel and adjacent to said second surface of said rigid member and a second position wherein each of said side panels extends outwardly generally perpendicular to said first surface of said rigid member and generally parallel to one another; and said catch member connectable to said first and second side panels when in said second position.

11. The wall hanging toss game of claim 10 further comprising:

hinge means disposed between each side panel and the peripheral side edge of the rigid member for pivoting the side panel between a first stored position wherein each of said side panels is disposed generally parallel to said rigid member adjacent said second surface and a second deployed position wherein each of said side panels is generally perpendicular to said rigid member extending outwardly with respect to said first surface.

12. The wall hanging toss game of claim 9 further comprising:

means connected to said second surface of said rigid member for supporting the rigid member from a vertical wall surface.

13. The wall hanging toss game of claim 9 wherein said means for holding comprises:

said catch member having a generally rectangular shape with a rigid elongated horizontal edge opposite from said rigid member, said rigid horizontal edge of said catch member supportable from said rigid member adjacent the rigid member when the catch member is in a stored position; and loop means adjacent each end of said rigid elongated horizontal edge of said catch member engageable with said rigid member when said catch member is in the stored position.

14. The wall hanging toss game of claim 13 wherein said catch member further comprises a flexible sheet material hanging downwardly from said rigid member in a banner-like manner when said catch member is in said stored position.

*15. A wall hanging toss game, comprising the combination of:*

*a generally flat, rigid member having a first surface suitable for printing, a second surface opposite from the first surface, and an outer periphery including a top edge, a bottom edge, and first and second side edges between the first and second surfaces, said first surface having a plurality of recesses formed therein spaced from one another;*

*a plurality of generally thin, wafer-like hook material targets adhesively secured to the rigid member in the recesses of the first surface, such that the targets appear generally flush with the first surface and appear separated from one another by open areas of the first surface; and*

*shock absorbing projectile means covered with loop material capable of being securely held in place when in contact with the hook material targets, said projectile means for throwing at the hook material targets from a distance.*

* * * * *